United States Patent
Boertjes et al.

(10) Patent No.: US 8,364,036 B2
(45) Date of Patent: Jan. 29, 2013

(54) METHOD AND SYSTEM FOR CONTROLLING OPTICAL NETWORKS

(75) Inventors: David Boertjes, Ottawa (CA); David Miedema, Ottawa (CA); Loren Berg, Richmond (CA); Frederic Poulin, Gatineau (CA); David Bownass, Ottawa (CA); Robert Palmer, Ottawa (CA); Mark Hinds, Ottawa (CA); Michael Hiridjee, Gatineau (CA); Saeid Seydnejad, Ottawa (CA)

(73) Assignee: Ciena Corporation, Hanover, MD (US)

( * ) Notice: Subject to any disclaimer, the term of this patent is extended or adjusted under 35 U.S.C. 154(b) by 1122 days.

(21) Appl. No.: 12/298,441

(22) PCT Filed: Apr. 27, 2007

(86) PCT No.: PCT/CA2007/000718
§ 371 (c)(1),
(2), (4) Date: Nov. 3, 2008

(87) PCT Pub. No.: WO2007/124581
PCT Pub. Date: Nov. 8, 2007

(65) Prior Publication Data
US 2009/0116837 A1 May 7, 2009

Related U.S. Application Data

(60) Provisional application No. 60/745,807, filed on Apr. 27, 2006.

(51) Int. Cl.
*H04B 10/20* (2006.01)
*H04B 10/08* (2006.01)
*H04J 14/00* (2006.01)

(52) U.S. Cl. .................. 398/58; 398/9; 398/13; 398/66

(58) Field of Classification Search ................ 398/9, 13, 398/57, 58, 66
See application file for complete search history.

(56) References Cited

U.S. PATENT DOCUMENTS

| 2002/0191241 | A1 | 12/2002 | Emery et al. |
| 2003/0163555 | A1 | 8/2003 | Battou |

OTHER PUBLICATIONS

Ramaswami et al., "Distributed network control for wavelength routed optical networks", INFOCOM 96, Fifteenth Annual Joint Conference of the IEEE Computer Societies, Networking the Next Generation, Proceedings IEEE, vol. 1, Mar. 24-28, 1996, pp. 138-147.
Yousong et al., "Efficient distributed control protocols for WDM all-optical networks", Computer Communications and Networks, 1997, Proceedings, Sixth International Conference, Sep. 22-25, 1997, pp. 150-153.
Maeda, "Management and control of transparent optical networks", Selected Areas in Communications, IEEE Journal, vol. 16, No. 7, Sep. 1998, pp. 1008-1023.
Mukherjee, "WDM optical communication networks: progress and challenges", Selected Areas in Communications, IEEE Journal, vol. 8, No. 10, Oct. 2000, pp. 1810-1824.
PCT International Application No. PCT/CA2007/000718, International Search Report dated Aug. 17, 2007.

*Primary Examiner* — Armando Rodriguez
(74) *Attorney, Agent, or Firm* — Kent Daniels; Blake, Cassels & Graydon LLP

(57) ABSTRACT

An optical control system is described which is capable of maintaining and optimizing a fiber-optic transport system within it's domain of control while interacting with other optical systems which are controlled independently. This allows the optical system to be incorporated as a building block into a larger optical network in a relatively arbitrary fashion. This provides an underlying control system for a non-linear system like optics network that is flexible and extensible.

20 Claims, 17 Drawing Sheets

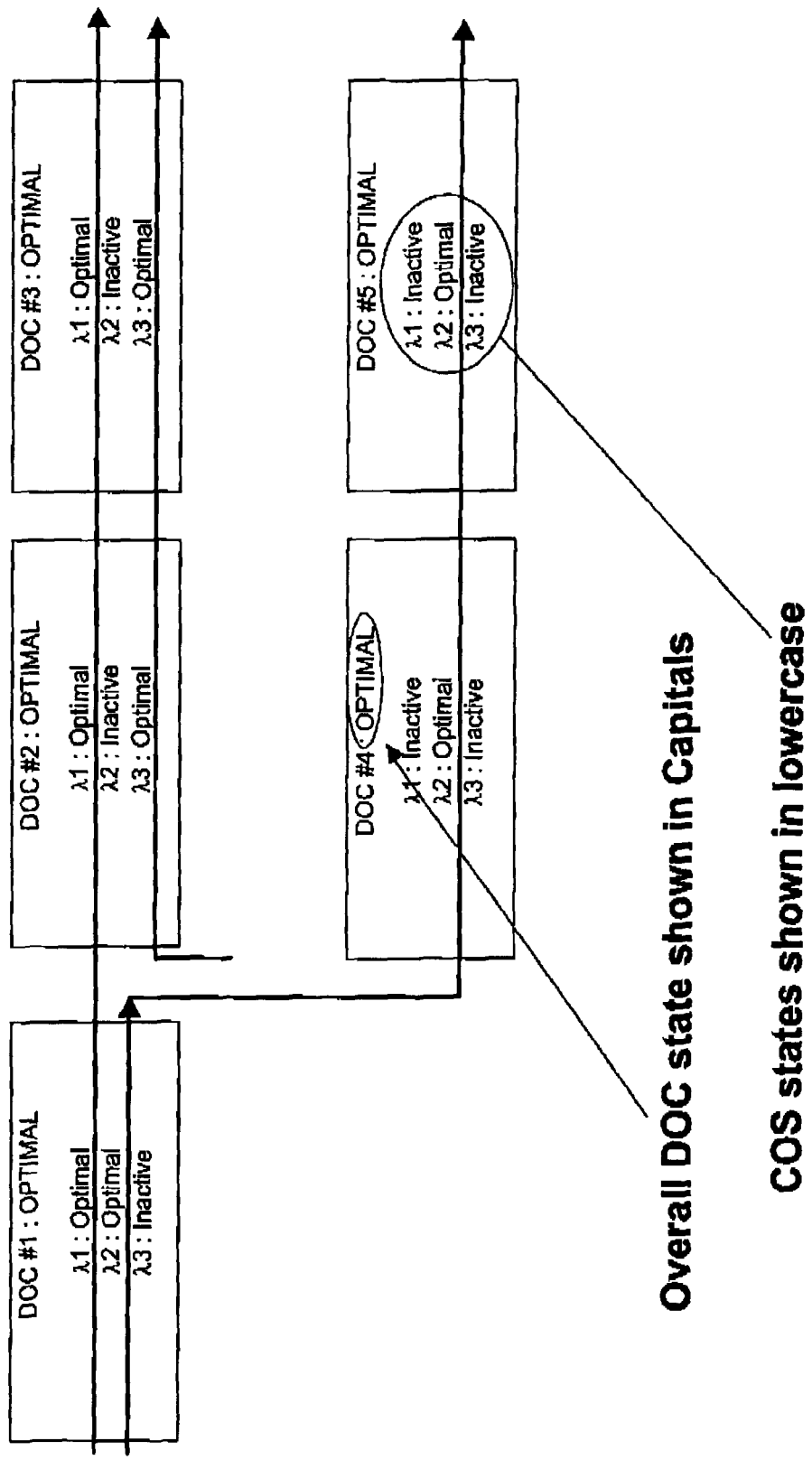

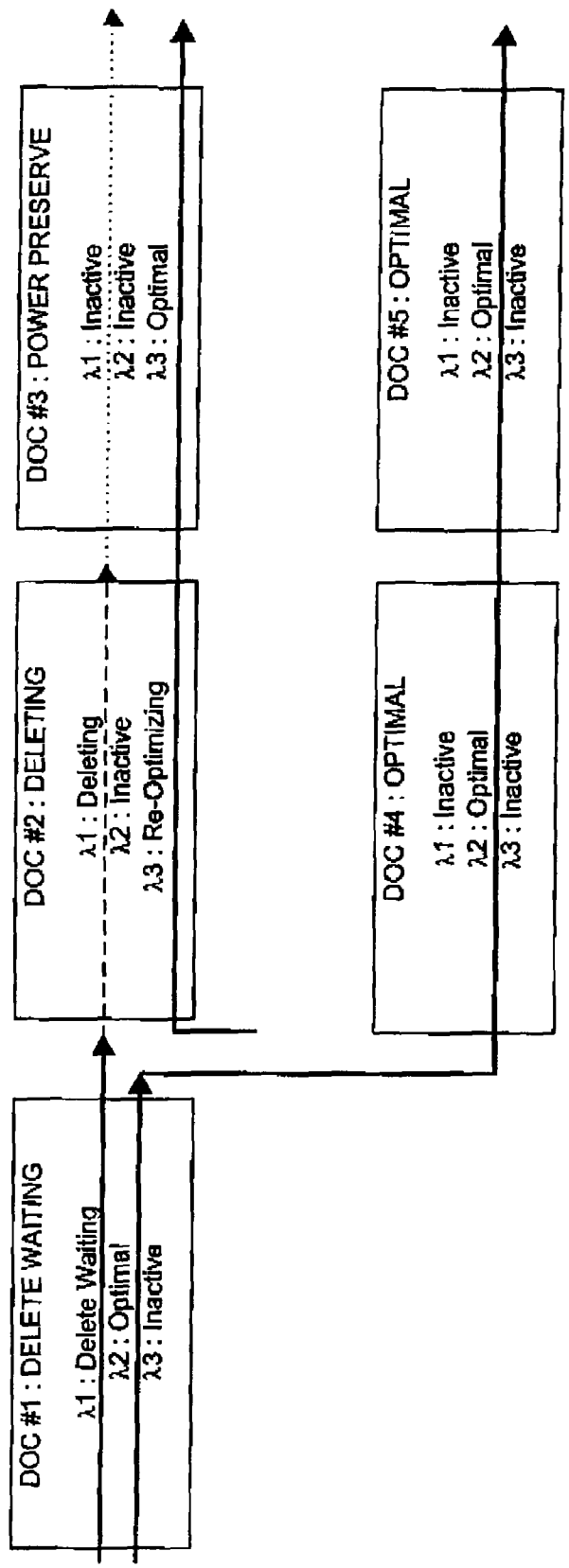

METHOD AND SYSTEM FOR CONTROLLING OPTICAL NETWORKS

CROSS REFERENCE TO RELATED APPLICATIONS

This application claims the benefit of priority of U.S. Provisional Patent Application No. 60/745,807 filed Apr. 27, 2006, which is incorporated herein by reference.

FIELD OF THE INVENTION

The present invention relates generally to optical networks. More particularly, the present invention relates to scalable, flexible optical transmission networks, and methods and systems for controlling same.

BACKGROUND OF THE INVENTION

The simplest optical system is a point to point system. This can be unidirectional or bidirectional. These were the first optical systems to be deployed even before the advent of optical amplification. Single wavelengths modulated with the information being transmitted would be coupled into and out of an optical fiber. The optical signal was then converted to/from electrical on either end of the fiber span, a practice called regeneration. The length of the optical span was limited mainly by the loss of the fibre. The advent of optical amplifiers allowed the transmission of the optical signal through multiple fibre spans by overcoming the loss of the fibre without electrical regeneration. They also allowed amplification of more than one optical channel within the same fibre, which allowed the introduction of wavelength division multiplexing (WDM). The transmission distance (length of span multiplied by the number of spans) was now limited by the chromatic dispersion of the fibre and the noise of the optical amplifiers. Optical dispersion compensators were introduced to combat dispersion, which extended the distance of propagation to the point that the limiting factors became the noise limits of the amplifiers and the non-linear interactions of the optical channels with the fibre itself. The advent of optical add/drop multiplexing (OADM) allowed these systems to serve intermediate locations other then the end points of the system.

A major disadvantage of the point to point system is system availability. If there is a failure of a piece of equipment or a cut of a fibre span, the system is immediately unavailable. Therefore these systems have been deployed in pairs, a working and a protection system which duplicated the equipment and fibre requirements. These systems are also bounded by electrical interconnections, which require electrical to optical and optical to electrical conversions.

Ring-based systems have been extensively deployed as a means to overcome the system availability limitations of point to point links by providing resiliency to fibre cuts and equipment failure within a single system, for example the bi-directional line-switched ring (BLSR). Ring based deployments are the norm for most high-availability deployments, however, the ring architecture does not always lend itself to the natural geographical layout of nodes in a service area. Extensive work has been done to build rings out of arbitrary demands and locations, or to provide sets of smaller rings which are connected by larger rings. These interconnections are done using electrical cross-connects, for example a Synchronous Optical Network Add/Drop Multiplexer (SONET ADM). The line-switching function of such a system relies on the detection and conversion of the optical signals into electrical signals and therefore the interconnection of such ring-based systems has remained electrical.

Another problem that needs to be addressed is the growth of optical networks, for example to satisfy increasing demand, or to expand the geographic reach of the network, or to interconnect existing networks.

The creation of a communications network which contains multiple optical systems, either ring-based or point-to-point or a combination of both, created the need for a means to control and analyze the overall network. A typical approach introduces a hierarchy of systems wherein there is a top-level Network Management System (NMS) which was responsible for all subtending systems.

Mesh architectures for optical networks have been developed in order to address complexity, scalability and flexibility issues with conventional ring or point-to-point networks. It would be best if the mesh itself could be relatively arbitrary in its topology in order to best fit the varying geographical and traffic demands, and to accommodate growth in said networks, with the least cost and effort. In order to support and interconnect various networks, the chosen architecture should support both mesh and ring deployments including ring-to-ring interconnect systems.

Current implementations of control planes, such as GMPLS, have grown from electrical switching/routing applications which have no channel interaction implications for performing switches. However this cannot be easily extended to scalable, extendible optical networks, such as optical transmission systems, including the optical amplifiers and the transmission fiber, act in such a way that actions taken on any one or set of channels is not independent of the other channels which are traversing the system. For example power transients in one set of channels cause power fluctuations on other channels through interactions such as amplifier spectral gain ripple and Stimulated Raman Scattering (SRS). Furthermore these can be increased by additional fluctuations caused by cascading control systems through which the signals pass. Note that these cascaded non-linear effects which are introduced by nodes in the system should be distinguished from the distortion of channels which occurs through non-linear interactions as the signal propagates through a waveguide, such as Cross Phase Modulation (XPM) and Four Wave Mixing (FWM).

One method of addressing this problem is to use optical-to-electrical conversion and then subsequent electrical-to-optical conversion. However, Electrical interconnection of optical systems requires that all of the optical channels are demultiplexed and treated individually with electrical regenerators which is costly, requires high power consumption, and requires a great deal of space.

Accordingly there is a need to improve the control and deployment of complex optical networks.

SUMMARY OF THE INVENTION

In a first aspect, the present invention provides an underlying control system for an optical network that is flexible and extensible by dividing an optical network into domains which can be considered system building blocks and which allows DWDM optical interworking between said domains. In an embodiment of the invention, a peer-to-peer discovery mechanism is used to transfer information between domains in order to facilitate the selection and control of the end-to-end path for an optical signal.

Preferably the domains (through their controllers) cooperate with each other in order to improve network performance. For example, embodiments can have peer-to-peer communication between the domains regarding state changes which can affect neighboring domains. Advantageously, this allows for the control of a mesh of optically coupled domains, wherein signals can pass between branches with a reduced need for optical-to-electrical conversion.

According to an aspect of the invention, the combination of such a co-operative process, auto discovery and the messaging between the neighboring enables a network which is any or all of: self organizing, self optimizing, self-monitoring and self-healing.

One aspect of the invention provides a method of controlling an optical network, said optical network comprising a set of domains, with each domain comprising a set of network elements controlled by domain controller, said method comprising: a. determining a requirement to adjust physical parameters; b. said domain controller controlling a state within said domain to satisfy said requirements; and c. communicating to one or more neighboring domains information about state changes needed to satisfy said requirement. Embodiments consistent with this aspect allow for domains which are optically coupled. Various types of domain boundaries can be used. For example nodes can be collected into domains such that the domains do not need to make internal routing decisions.

In addition such embodiments can have the domain controller first send a signal to neighboring domain controllers comprising an indication of the parameters or state it intends to change prior to implementing said change. This allows the domains to establish a filtering operation at a domain boundary where cascading effects can occur.

Another aspect of the invention provides a method for controlling a group of network elements which comprise one of a plurality of optically coupled domains of an optical network comprising: a. monitoring the state of its domain; b. monitoring for signals received from neighboring optically coupled domains; c. controlling optical transport parameters and state within it's domain responsive to changes within said domains; and d. sending data to said neighboring optically coupled domains indicative of changes within it's domain.

Another aspect of the invention provides an optical network comprising: a. a plurality of optically interconnected control domains, each domain comprising a domain controller; b. a plurality of nodes interconnected by transmission media within each domain; and c. at least one transmission path between neighboring domains configured to allow traversal of optical channels between said neighboring domains without electrical conversion; wherein each domain controller includes a processor, and an executable file embodied in machine readable memory, which when executed by said processor, causes said domain controller to:

i) make determinations of control parameters and state for its domain; and ii) interact with domain controllers of at least one optically interconnected neighboring domain such that information regarding changes to said control parameters and state are communicated between said domain controllers.

Another aspect of the invention provides a domain controller for controlling one of a plurality of optically coupled domains of an optical network comprising: a.

determining means for determining a requirement to adjust physical parameters; b. means for controlling the state within said domain to satisfy said requirements; and c. means for communicating to one or more neighboring domains information about state changes needed to satisfy said requirement.

In further aspect, the present invention provides a computer program product comprising a machine readable medium for storing computer executable instructions, which when executed by a processor in a node of an optical network, cause said node to operate as domain controller and to carry out any of the methods described and/or claimed herein.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 7A illustrates a set of five domain controllers, each of which are optically coupled to at least one other domain through at least one wavelength channel;

FIG. 7F illustrates DOC2 observing the downstream DOC3 state change and entering into a deleting state;

DETAILED DESCRIPTION

Figure 1:
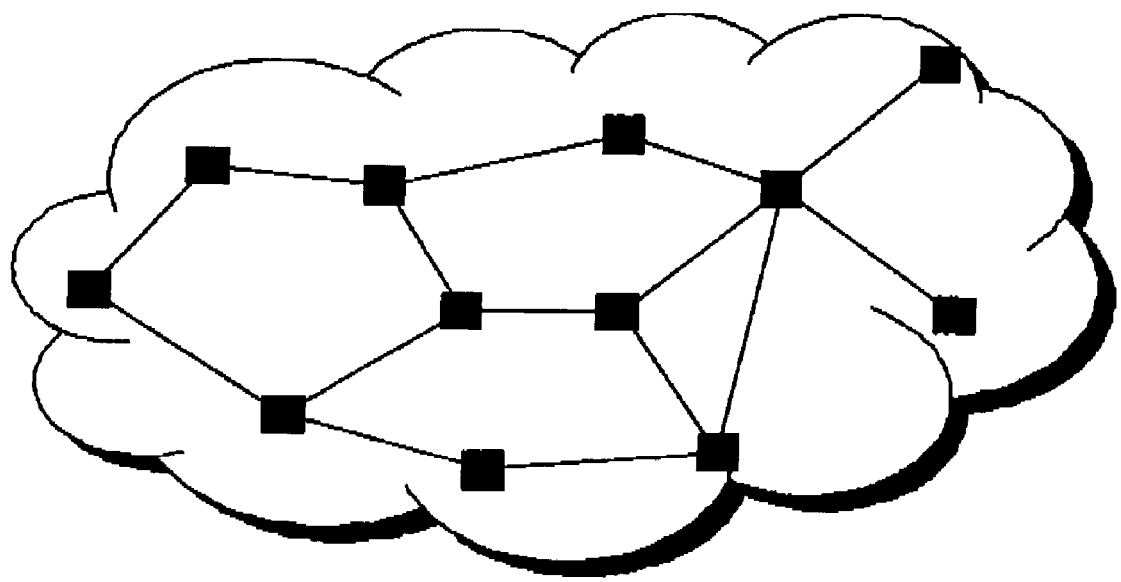
FIG. 1 is a representation of a mesh network comprising a single domain.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage media including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

One way to implement and control optical networks which are scalable is to add rings or nodes to an existing network in order to accommodate additional demand. Typically an optical-electrical-optical conversion takes place at a bridging point. However, there are various advantages in being able to physically interconnect at the DWDM optical level in order to save the space, power, and cost associated with optical-to-electrical conversion of each constituent channel. This is especially true in the typical situation where this conversion is made for the sole purpose of electrical-to-optical conversion on the other side of the system interconnection boundary.

Thus there are advantages and problems with either a full end-to-end control system or a series of local controllers. Thus we suggest a novel way of combining the two, by utilizing a series of intermediate controllers at the domain level, which control the optics within a domain via the use of local controllers at the node level, but which coordinate their actions with each other across domain boundaries. This interaction at the boundaries between the domain controllers, allows them to hand-off and coordinate with each other and thus provide the benefits of an end-to-end control system without needing to predetermine its geometry or its topology from day one. Furthermore, such a system is extensible, and it's flexible and can grow as needed, because a system operator can now add and connect subdomains, or domains, together to make a bigger mesh system in an arbitrary manner. Advantageously, embodiments of the invention can be expanded or re-configured while in-service, preferably remotely, without impacting performance or manageability. Furthermore, signaling between the domains can not only reduce optical degradations and transients, but can also provide the management system with useful information about the channels and the domains they pass through.

An aspect of the invention provides for the division of an optical network into domains which can be considered system building blocks and an optical control system which allows DWDM optical interworking between said domains. In an embodiment of the invention, a peer-to-peer discovery mechanism is used to transfer information between domains in order to facilitate the selection and control of the end-to-end path for an optical signal. The domain boundaries of these systems can be either an electrical or optical hand-off. In an optical hand-off type system, a channel can propagate through successive domains without optical to electrical conversion.

The choice of the groups of equipment and fiber spans which comprise a domain can be rather arbitrary. The absolute limits are:
1. The entire network is included in a single domain (FIG. 1)
2. Domain boundaries defined by any OADM function (FIG. 2).

In FIG. 1, the domain is responsible for all routing internally since it contains the mesh network itself. In effect there is no domain, but a single network. As the network grows, it can become extremely complex, making it very difficult to deploy, control and verify.

Figure 2:
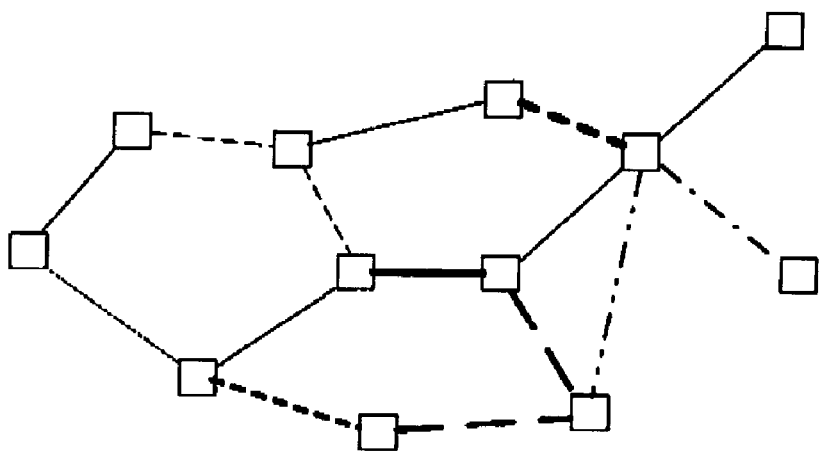
FIG. 2 is a representation of a mesh network segmented into domains at every channel access site.

In FIG. 2, every OADM node becomes a domain boundary with channel interconnection at every channel access site. All sections essentially become domains, since no flexibility is supported in a section. Channels are routed between domains and domains must communicate and coordinate in all cases. This makes the deployment rules simple, but the peer-to-peer control potentially complex as there can be many peers to coordinate, and the peering function must provide enough information externally for routing to take place.

Accordingly it is desirable to size domains between these two options. Domains can be chosen on the basis of geographical constraints, topology constraints, organization structures, traffic patterns and traffic priority schemes. An example of a traffic pattern driving the choice of domain boundaries would be where a backbone portion of the network carries the bulk of the traffic, in which case it would make sense to make said backbone a single domain, with lower capacity or less important branches being separate spurs, each comprising a separate domain, off of this backbone domain.

Figure 3:
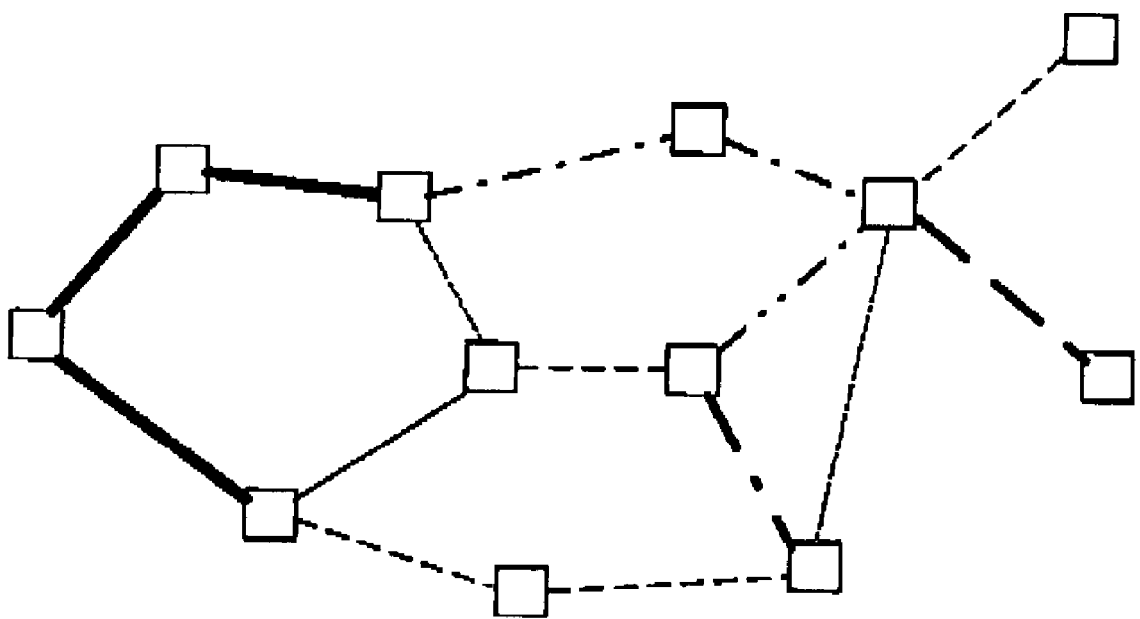
FIG. 3 is a representation of a mesh network segmented into domains at locations where routing decisions are to be made, according to an embodiment of the invention.

According to an embodiment of the invention illustrated in FIG. 3, domain boundaries are defined such that a domain does not require internal routing decisions. This means that 2-connected OADMs may be considered inside a single domain while a branching point constitutes a boundary between domains. It should be appreciated that this is not necessarily a hard rule, as it can be desirable to also place a boundary at a 2-connected node to keep the size and geographical extent of the system reasonable.

Using such a domain as the fundamental building block for a complex optical network allows interconnection of an arbitrary number of domains in almost unlimited topologies (subject to limitations of optical and control performance).

According to one embodiment of the invention, domains can be managed by a network management system for controlling end to end connections by sending requests for connections to domain controllers. Such a network management system (for example, an ASON control plane) works by providing a top-down view of the network and the domains of which it is comprised.

According to another embodiment of the invention, the task of provisioning a channel through multiple domains is performed through peer-to-peer communications (e.g. via a control plane such as GMPLS). This can be used in conjunction with an auto-discovery mechanism. Preferably the domains (through their controllers) cooperate with each other in order to improve network performance. For example, embodiments can have peer-to-peer communication between the domains to make the network any or all of: self organizing, self optimizing, self-monitoring and self-healing. Domain interaction can be simplified by limiting domain interaction to adjacent or neighbor domains.

Still another embodiment can combine a central management system for end-to-end connection management, with peer-to-peer domain control of the optical transmission paths. Advantageously, such a system allows for optical interworking at the DWDM interface level. Accordingly one aspect of the invention provides a peer-to-peer based control system is provided which controls the analog complexities of the photonic path. This is especially useful in the case of optically coupled domains, which allow photonic switching without the need for electrical conversion. In such a system, the domain controllers communicate with each other to manage the low-level analog aspects of the photonic path, such as perturbations introduced by the control systems when actions taken on any one or set of channels is not independent of the other, which can affect signals in neighboring domains as well, either by cascading from one domain to the next, or via other interference effects. This allows for an end-to-end connection management system, such as a control plane, to determine and provision end-to-end connections based on capacity, bandwidth availability, QOS requirements, and other macro factors at a high level without needing to also be responsible for the management of the low-level analog aspects of the system.

Accordingly, one aspect of the invention provides a method and system for controlling an optical network, said optical network comprising a set of domains, with each domain comprising a set of network elements controlled by domain controller, said method comprising:
 a. determining a requirement to adjust physical parameters;
 b. said domain controller controlling a state within said domain to satisfy said requirements; and
 c. communicating to one or more neighboring domains information about state changes needed to satisfy said requirement According to an embodiment, the information about state changes comprises information about channels being added, deleted, re-optimized, or whether the domain has changed state to prevent cascading of non-linear effects. Note that in some embodiments this information is communicated in advance of the action, in order to provide neighboring domains an opportunity to take action.

Providing such information allows the system to
 i) Launch optimal optical power so as to minimize optical signal to noise ratio (OSNR) while not incurring significant non-linear penalties (self phase modulation (SPM), etc.)
 ii) Allow more or less preferential treatment of channels depending on the requirements of the transmission path, e.g. allowable incremental penalty
 iii) Allow for the calculation of the path performance by propagating such information across domain boundaries for the purpose of end-to-end path monitoring and control Furthermore each optical system preferably advertises its available links for the purposes of routing channels through the mesh in such a way that a viable route may be selected which includes physical aspects of the transmission such as
 i) Wavelength blocking (which channels may already be present)
 ii) Expected OSNR
 iii) Residual path dispersion
 iv) Latency
 v) Etc.

Depending on the embodiment, the information can include information regarding any or all of the following:
 1) parameters to coordinate the control of an end-to-end control and optimization of the optical channels;
 2) parameters which describe the performance of the path which is contained within the domain (channel based path information);
 3) parameters which advertise available links with enough information to calculate the viability of the channel traversing the path (available path information).

Table 1 includes general end-to-end parameters:

TABLE 1

|  | Parameter |
| --- | --- |
| Transmitter | OSNR bias |
|  | Line rate |
|  | FEC gain |
|  | Minimum launch power |
|  | Maximum launch power |
|  | Tx wavelength range |
|  | Tx output power range |
| Receiver | Sensitivity threshold |
|  | Overload threshold |
|  | Damage threshold |
|  | Maximum positive transient |
|  | Minimum negative transient |
| Path | Required OSNR |
|  | Residual Dispersion Range |

Examples of channel based path information as shown in Table 2. These parameters detail the performance of the path which is contained within the control system of interest. The parameters are provided on a channel by channel basis. Absent channels are defined as noise channels in order to be able to have a complete representation of the spectral area of interest.

TABLE 2

|  | Parameter |
| --- | --- |
| Path performance | Channel output power |
|  | OSNR |
|  | Estimated accuracy |
|  | Channel optical state |
|  | Control system state |
|  | Possible Values |
| Channel State | In service/Out of service |
|  | Channel optical state |
| Control system state | Required OSNR |
|  | Residual Dispersion Range |

Examples of available path information are shown in table 3.

TABLE 3

|  | Parameter |
| --- | --- |
| Transmitter | OSNR bias |
|  | Line rate |
|  | FEC gain |
|  | Minimum launch power |
|  | Maximum launch power |
|  | Tx wavelength range |
|  | Tx output power range |
| Receiver | Sensitivity threshold |
|  | Overload threshold |
|  | Damage threshold |
|  | Maximum positive transient |

TABLE 3-continued

| Path | Parameter |
|---|---|
| | Minimum negative transient<br>Required OSNR<br>Residual Dispersion Range |

Figure 4:
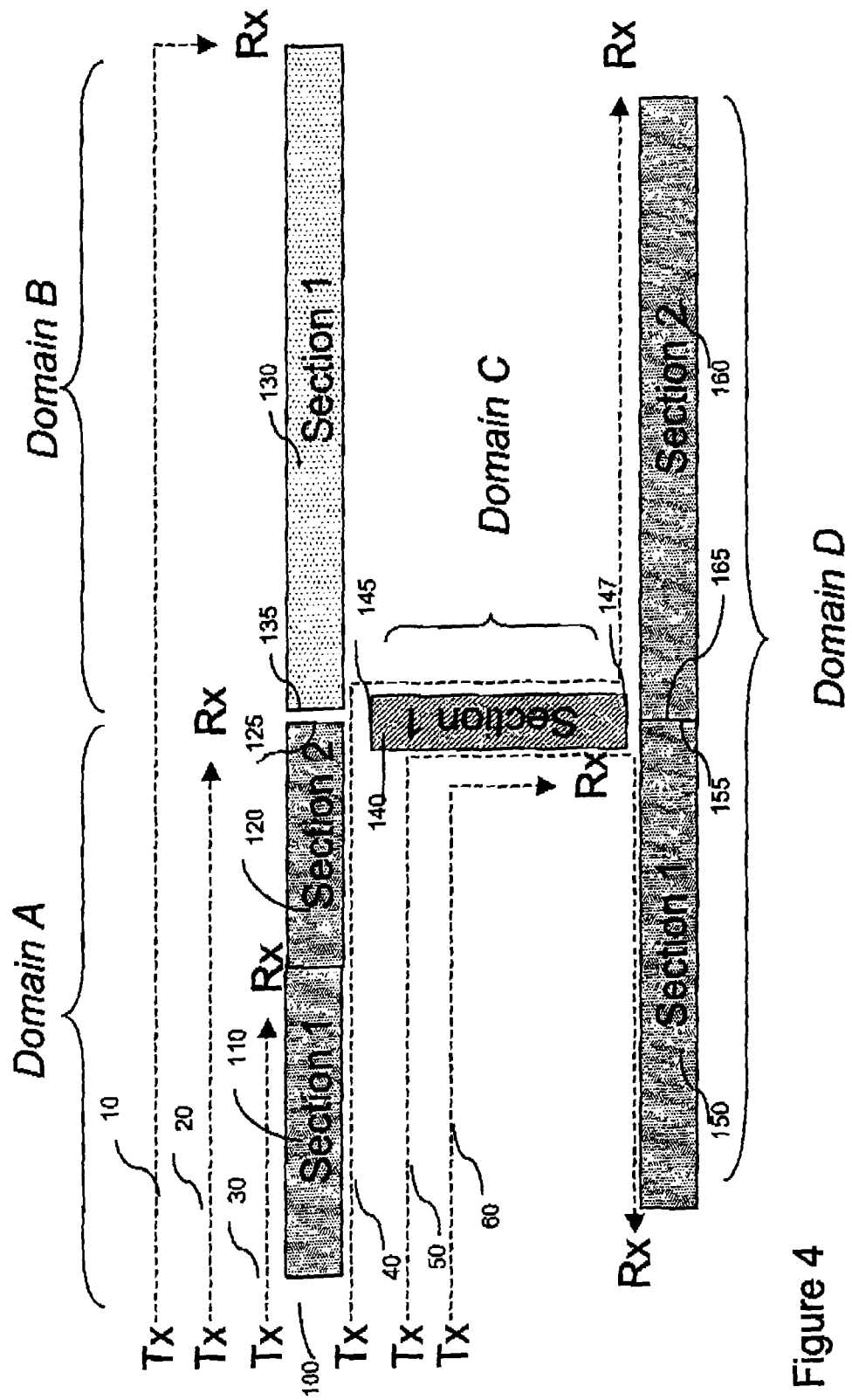
FIG. 4 is a schematic diagram illustrating the interconnection of several optically coupled domains, according to an embodiment of the invention.

FIG. 4 is a schematic diagram illustrating the interconnection of several optically coupled domains according to an embodiment of the invention. In the figure Domain A comprises two sections, namely section 1 labeled as 110 and section 2 labeled as 120. Domain A has an ingress at 100 and an egress at 125. Domain B comprises a single section 130 with an ingress 135. Domain C comprises a single section 140 with an ingress of 145 and an egress 147. Domain D has two sections, a first section 150 and a second section 160, with an ingress part at the junction of the two sections, labeled as 155 and 165 respectively. Domain A, Domain B and Domain C are optically coupled by a Y junction at 125, 135 and 145. Domain C and Domain D are optically coupled by a T junction at 147, 155 and 165. Note that a Y-Branch node may be preferred when traffic demands on each branch are equal, whereas a T-branch node may be preferred when it is desirable to offer preference to traffic demands on the main branch are preferred. It should be appreciated that these are just examples and other types of junctions can be used, for example a Spur node (interconnection is on a per channel basis via fixed physical connectivity). Furthermore, the invention is not limited to 3 way junctions. Branching points with multiple branches can be supported.

Domain A is shown to include 6 optical channels originating at ingress node 100. In this figure Tx represents an E to O transmission function and Rx represents an O to E function. As can be seen, channel 10 propagates through both sections of Domain A and through Domain B. Optical channel 20 is terminated at an OADM node (not shown) at the end point of Domain A. Similarly optical channel 30 is terminated at the end of section 110. Optical channel 40 propagates through Domain A, through Domain C and then through section 160 of Domain D. Optical channel 50 propagates through Domain A and through Domain C and then through section 150 of Domain D. Optical channel 60 propagates through Domain A and Domain C terminating at the end of section 140 of Domain C.

FIG. 4 illustrates several concepts. First a domain can have one or multiple sections. For ease of illustration a maximum of two sections are shown in the figure, although it should be recognized that multiple sections can be included in any of the domains. It should be appreciated that each section can include a plurality of nodes including an add/drop node at the ingress and egress of each section, along with a number of amplifiers located therebetween. A section is bounded by any type of optical add/drop multiplexer function. Thus channels can be added or dropped, or terminated at any section boundary. The number of sections in any given domain depends upon how many add/drop or branch locations are required or desired by the network operator.

Second, the network can include different types of branch points. In this figure a Y and T branch are illustrated through it should be appreciated that other types of optical flexibility points or branch points can be included, including multiple degrees of branching. Embodiments of the invention provide for remotely reconfigurable optical branching, expandable in-service to n-degrees without impacting optical performance or manageability.

Third, FIG. 4 also illustrates that a channel at the start of Domain A can go anywhere in the network (even across multiple domains) without regeneration (in other words without E to O conversion). For example channel 40 transverses Domain A, Domain C and section 160 of Domain D without being converted. It should be noted that the system can include many additional channels including channels in the opposite direction which are not shown in order to avoid unnecessary clutter in the figure. Indeed it should be appreciated that paths can originate from any add/drop point in the network and can terminate at any other drop/add point in the network shown.

According to one embodiment, there is no need for a dedicated domain controller within each domain. Rather a node within the domain (typically, but not necessarily at a domain boundary) can be designated as a domain controller and thus includes either includes a controller which operates as both a local controller of the node and a domain controller, or two separate controllers. Alternatively it is possible for the domain controller to be distributed—for example it is possible for every element within the domain to run an instance of the same software and operate in a self-coordinating manner to execute all of the functions of the domain controller.

Figure 5:
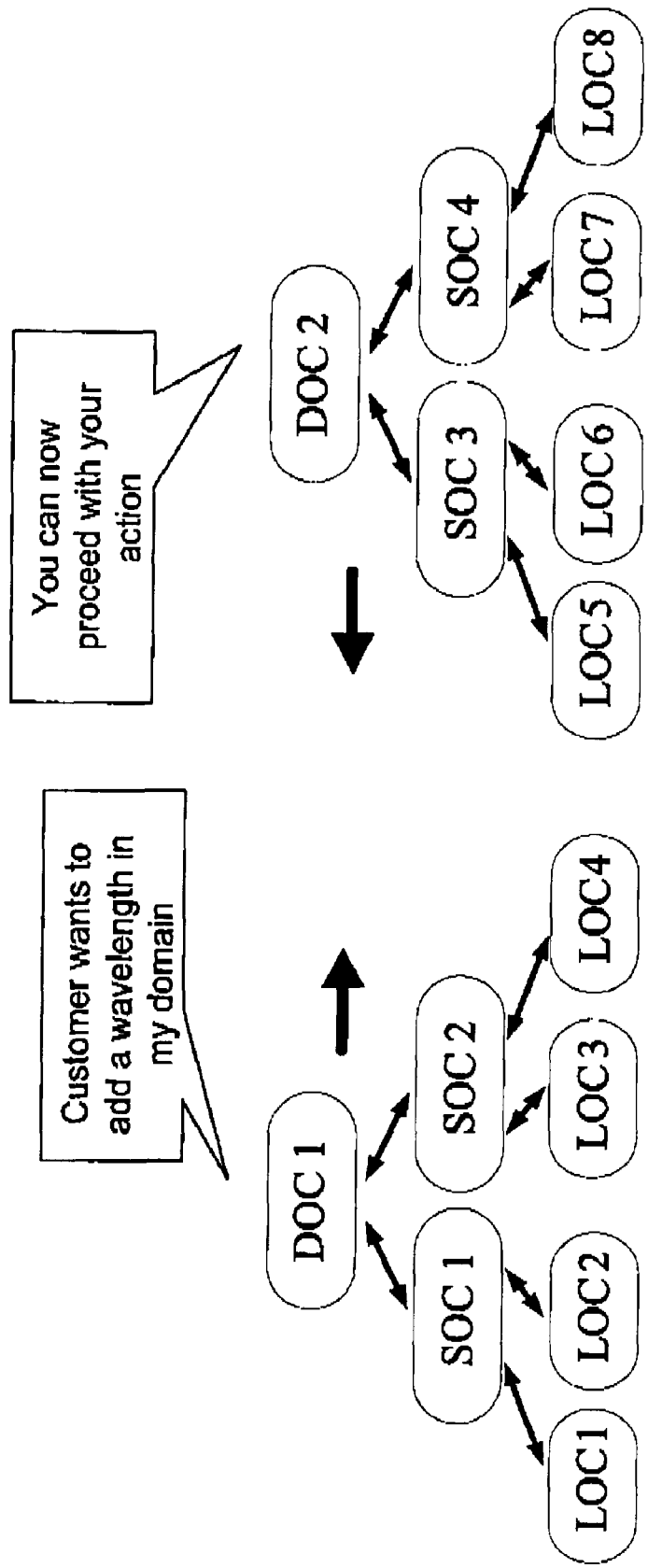
FIG. 5 is a schematic diagram representing different layers of controllers within two domains according to an embodiment of the invention.

FIG. 5 is a schematic diagram representing different layers of controllers within two domains according to an embodiment of the invention. This example also illustrates an embodiment in which the domain controller does not simply transmit the parameters, but rather illustrates a peer to peer control model where the domains agree on the next actions to take.

Domain 1 comprises four nodes each with a local controller (LOC1, LOC2, LOC3, LOC4 respectively). In this example LOC1 and LOC2 control nodes which comprise section 1 and therefore communicate with section optical controller SOC 1 which in turn communicates with DOC 1. This domain also includes a second section controlled by SOC2, which is in communication with and controlled by DOC1, and similarly is in communication with and controls LOC3 and LOC4 which control the two nodes which comprise the second section. Similarly Domain 2 comprises two sections controlled by SOC3 and SOC4, which are each in communication with and controlled by DOC2. SOC3 is also in communication with and controls LOC5 and LOC 6 which are the controllers for the two end nodes of this section. Similarly SOC4 is also in communication with and controls LOC7 and LOC8 which are the controllers for the two end nodes of this section. It should be noted that this is just an example and that there may be a different number of sections in each of the domains and each section can have a different number of nodes (with corresponding LOCs). In this example there is a customer request to add a wavelength in Domain 1. In response DOC1 sends a signal to DOC2 advising it intends to add the wavelength. DOC2 will then analyze its state, and carry out any necessary actions in order to prepare for the change of state communicated by the parameters in the signals sent by DOC1. It will then send a signal back to DOC1 advising that it is ready so that DOC1 can proceed with the action. One possible action DOC2 will take is to enter into a filtering mode which isolates its domain from the effects of the actions carried out in the first domain. For example the border node at the branching point, node 5, will have its controller (that is to say that LOC5) enter into an isolation mode to prevent a cascading affect. Thus it can be considered that Domain 2 enters into an isolated mode or is locked prior to Domain 1 initiating the change (for example adding of a channel or re-optimization). This will be explained in more detail below.

According to an aspect of the invention, each domain includes a domain controller for controlling optical transport parameters and states within its domain responsive to changes within its domain and responsive to data received from optically coupled domains indicative of changes within said domains, and for sending data to optically coupled domains indicative of changes within its domain. According to one embodiment, an initiating domain sends a warning signal of a planned operation to neighbor domains which will be affected by said planned operation prior to implementing said operation. This allows the neighbor domains to first implement a operation to allow for said planned operation, which then notify the initiating domain, which in turn implements said operation once advised of said neighbor domains' successful change of state.

Note that some operations, for example the deletion of a channel, will directly affect all optically coupled domains between the ingress point of that channel and its egress point. Accordingly for an embodiment of the invention, if the planned operation directly affects downstream domains, for example by changing a channel which propagates through said downstream domains, each successive downstream node which is directly affected communicates the planned operation downstream, until the message reaches the egress domain which includes the egress node for said channel. At which point the egress domain executes an action to accommodate said planned operation and then notifies its upstream domain of its change of state, and then each successive upstream domain executes an action to accommodate said planned operation and then notifies its upstream domain until the initiating domain is so notified.

However other operations may only indirectly affect downstream domains, for example by changing a channel which does not propagate through said downstream domains, but affects channels which do. It should be noted that some operations will directly affect some domains, and indirectly affect others. In such a situation embodiments of the invention will cause indirectly affected neighboring domains to enter a filtering state to prevent cascading effects prior to said initiating domain executing said planned operation.

For example, the following rules can be implemented according to an embodiment of the invention:

1) Each domain (DOC) controls it's current overall state, based on inputs from neighbors. According to a peer-to-peer embodiment of the invention, these inputs typically take the form of an indication of the parameters changed (or to be changed), rather than the form of instructions to change from upstream/downstream DOCs. However, alternative embodiments could employ a master-slave arrangement. Such an alternative may be used, for example, when one domain is given a higher priority.
2) when a domain receives a request (add/del/re-opt etc.)— it re-evaluates its overall state, such as is described in greater detail below with respect to the truth table 220 of FIG. 10.
3) when a domain detects a state change in a neighboring DOC, it re-evaluates it's own local DOC state to determine whether it needs to change.
4) When a DOC changes its (local) state, a messaging sequence occurs, in which neighboring domains are advised to re-evaluate and potentially change their state. According to one example:
   i) The Local DOC sends a new Signal (i.e. "pass on the new state") upstream;
   ii) In response, the Upstream DOC will re-evaluate its state and pass back the result;
   iii) In response, the Local DOC will re-evaluate its own state;
   iv) In response the Local DOC Signals downstream (i.e. "pass on the local DOC state");
   v) In response the Downstream DOC will re-evaluate it's state. This may trigger the receiving DOC to initiate the same process (which may cascade into a set of nested processes). If no change, or once complete, it and pass back the result
   vi) In response the Local DOC re-evaluates it's own state (this may trigger a change, in which case the process repeats)

Figure 6:
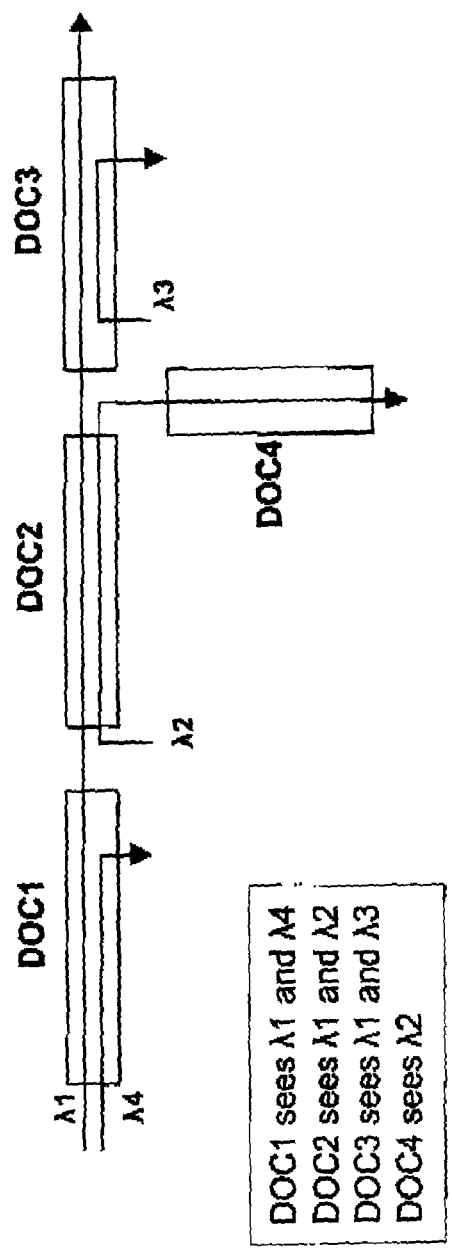
FIG. 6 is an illustration of the mitigating effect of local DOC operations on downstream domains according to an embodiment of the invention.

FIG. 6 illustrates the mitigating effect of local DOC operations on downstream domains according to an embodiment of the invention. In this example there are four domains, wherein λ1 propagates through Domains 1, 2 and 3; λ4 terminates with Domain 1; λ2 propagates through Domain 2 and Domain 4; and λ3 is local to Domain 3.

Thus in this example DOC1 sees λ1 and λ4, DOC2 sees λ1 and λ2, DOC3 sees λ1 and λ3 and DOC4 sees λ2 only. According to an embodiment of the invention before performing power-affecting operations (re-optimization, channel addition or deletion) on shared channels the domain which is about to perform the operation first warns downstream domains and waits for confirmation that all affected downstream domains are locked (e.g., have entered a POWER PRESERVE mode).

For example, for a request to Add λ2 in DOC2, DOC2 determines the list of channels shared with downstream domains (in this case λ1 and λ2).

DOC2 signals to downstream domains that it wants to perform a power-affecting action on those shared channels. DOC3 receives an indication for example, in the form of a token, that an upstream action was requested for λ1, causing DOC3 to go into power preserve mode, and then sends an appropriate signal or token back. Meanwhile, DOC4 receives an indication that an upstream action was requested for λ2. In response, DOC4 enters into power preserve mode, and sends a token back. Once DOC2 receives notification that all affected shared channels are locked (i.e. downstream in power preserve mode), DOC2 starts the addition of λ2.

Figure 7B:
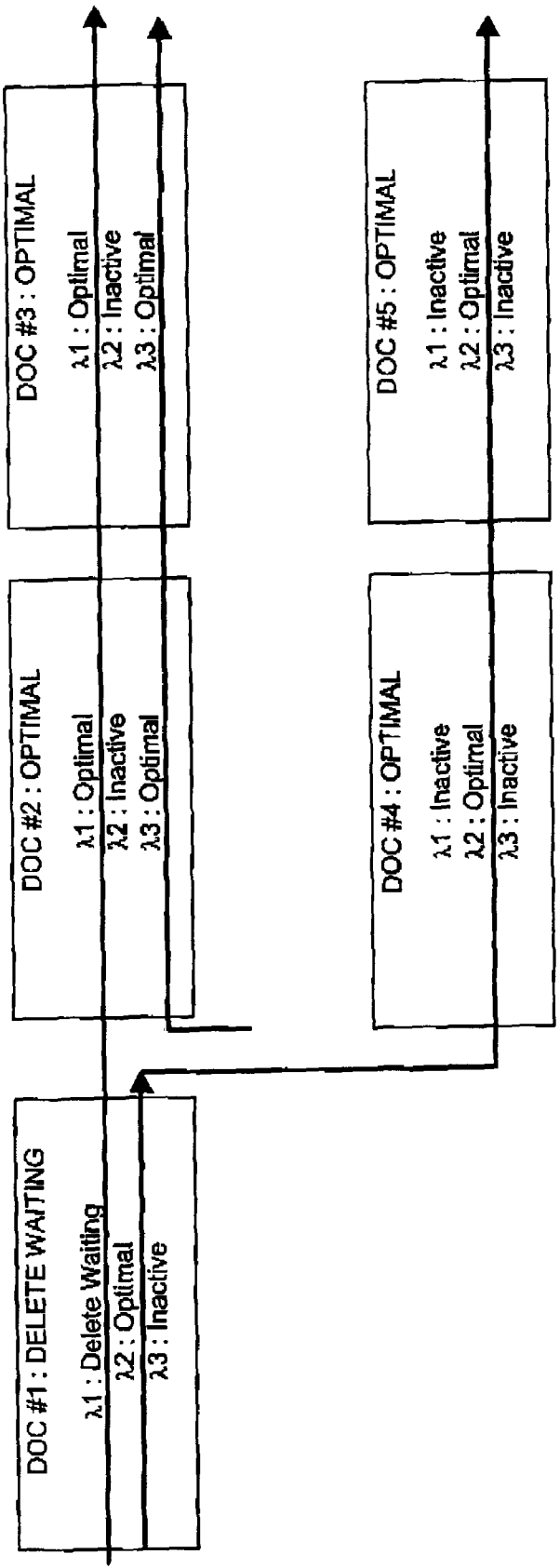
FIG. 7B illustrates the operations carried out by the DOC1 when a delete request is initiated within its domain.

FIGS. 7A through 7I illustrate a set of five domain controllers, each of which are optically coupled to at least one other domain through at least one wavelength channel. These figures show an example of peer to peer control, which has the effect of end-to-end connection control, according to an embodiment of the invention. It should be noted these figures represent a simplified example to illustrate the overall concept, without cluttering the example with every single step or signal. These figures illustrate a series of steps executed by the domain controllers (DOCs) of their respective domains, in order to implement a change (in this example, deleting a channel, namely, wavelength one). FIG. 7A illustrates an initial optimal state and illustrates a labeling convention wherein the overall DOC state is shown in capital letters and wherein the individual channel optimization states (COS) are shown in lower case.

FIG. 7B illustrates the operations carried out by the DOC1 when a delete request is initiated within its domain. It should be noted that this is not restricted to a delete request at the channel ingress point of the domain, but could also result from a channel deletion at a section boundary within the domain, as shown for example in FIG. 4, wherein channel 30 is deleted at the section boundary between sections 1 and 2 of Domain 1. Once the delete request is received, DOC1 changes its state to DELETE WAITING and also changes the COS state for channel λ1 to "delete waiting". In this embodiment DOC1 cannot start the delete process at this time as there are neighboring domains which will be affected by the deletion of λ1. In particular the deletion of channel 1 will affect λ3 in Domains 2 and 3 and will also affect λ2 which is optically coupled through Domains 4 and 5. As discussed herein, DOC1 is aware of these domains through a process of self discovery. In this embodiment, DOC does not need to determine which downstream domains will be affected. Rather, it simply needs to tell adjacent downstream DOC's, who will in turn send a notification to adjacent DOC's.

Figure 7C:
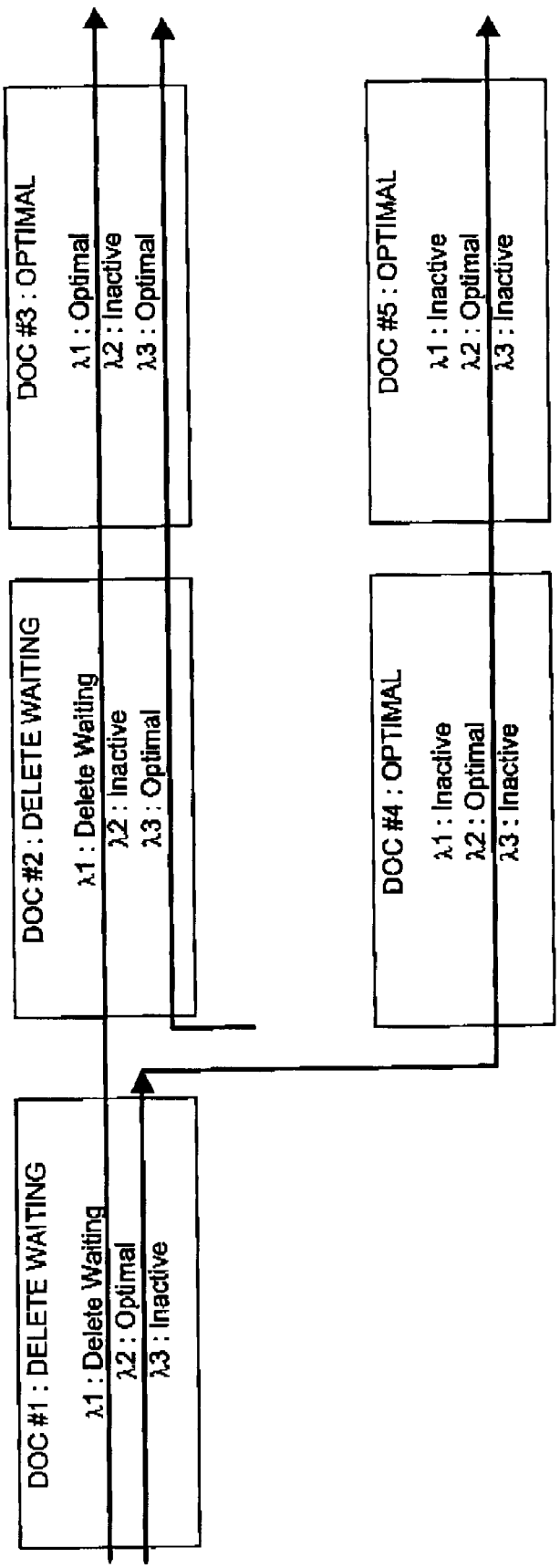
FIG. 7C illustrates DOC2 observing the upstream DOC1 state change and entering into a delete waiting state.

FIG. 7C illustrates domain controller 2 observing the upstream DOC state change (for example by receiving an indication from domain controller 1 that it wishes to delete λ1) and reevaluates its own state. It determines that a downstream DOC (in this example DOC3) will be affected and is not in a suitable filtering state, so it changes its domain state to delete waiting, and communicates its intention to domain controller 3.

Figure 7D:
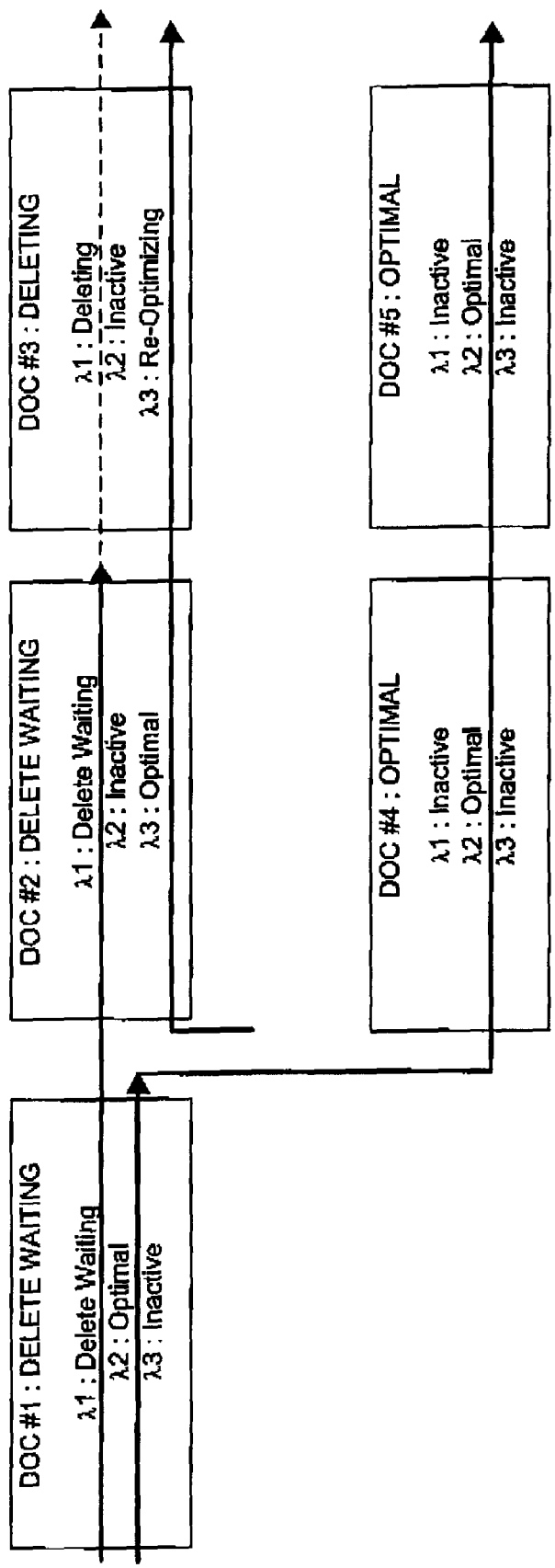
FIG. 7D illustrates DOC3 observing the upstream DOC2 state change and entering into a deleting state.

FIG. 7D illustrates domain controller 3 observing the upstream DOC state change and reevaluates its own state. In this example, there is no downstream DOC from DOC3 (as in this example it is the egress domain for λ1), so DOC3 can begin the delete process. The DOC state for DOC3 changes to DELETING wherein a delete algorithm is executed to determine what parameters need to be changed in response to the deletion of λ1 shown in FIG. 7D by the dashed line for λ1. In this example the λ3 COS state needs to re-optimize to compensate for the deletion of λ1.

Figure 7E:
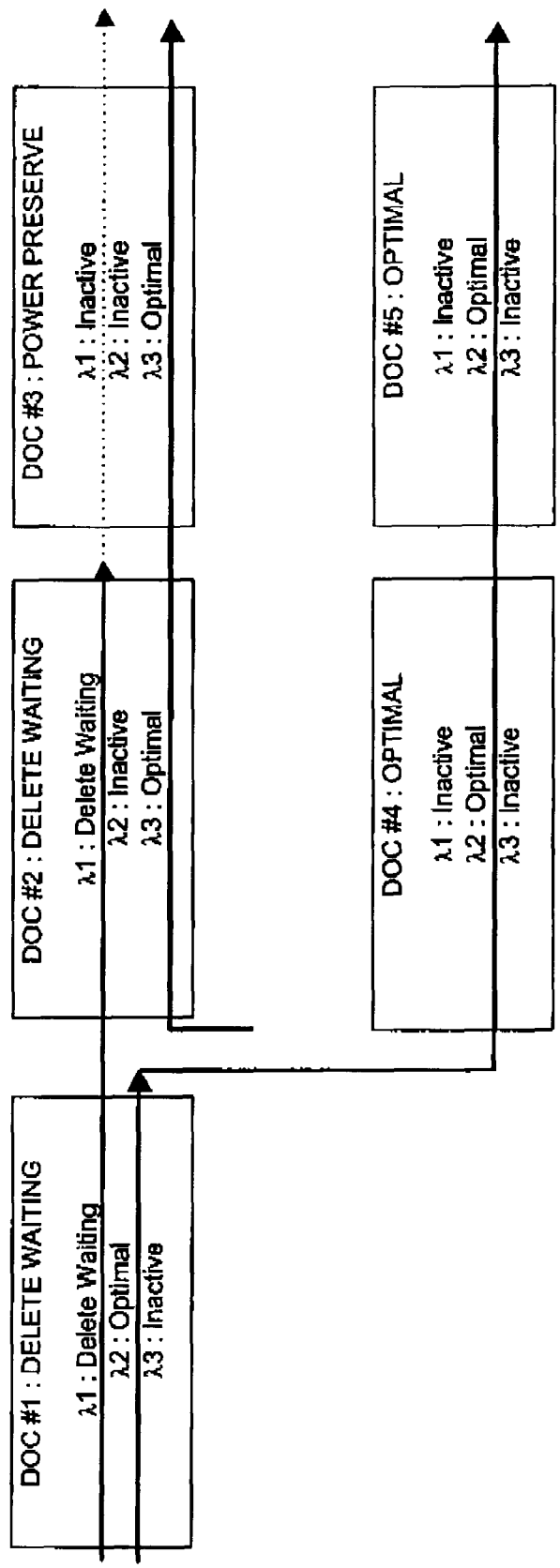
FIG. 7E illustrates DOC3 entering a power preserve mode in order to block cascading effects when DOC2 executes its pending delete request.

In FIG. 7E domain controller 3 enters into a filtering mode, labeled POWER PRESERVE mode after rendering λ1 inactive and re-optimizing λ3. This is implemented in order to block cascading effects while Domain 2 deletes λ1 (verify and describe power preserve mode). It should be noted that in some embodiments Domain 3 will first send a signal that it has optimized its condition to Domain 2, which will then again notify its neighbors that it intends to delete λ1 which will trigger Domain 3 to enter the POWER PRESERVE mode. In any event after Domain 2 sees the state change downstream and realizes the conditions are now safe for it to delete the channel, it enters into a delete state wherein λ1 is deleted and λ3 is re-optimized as illustrated in FIG. 7F.

Figure 7G:
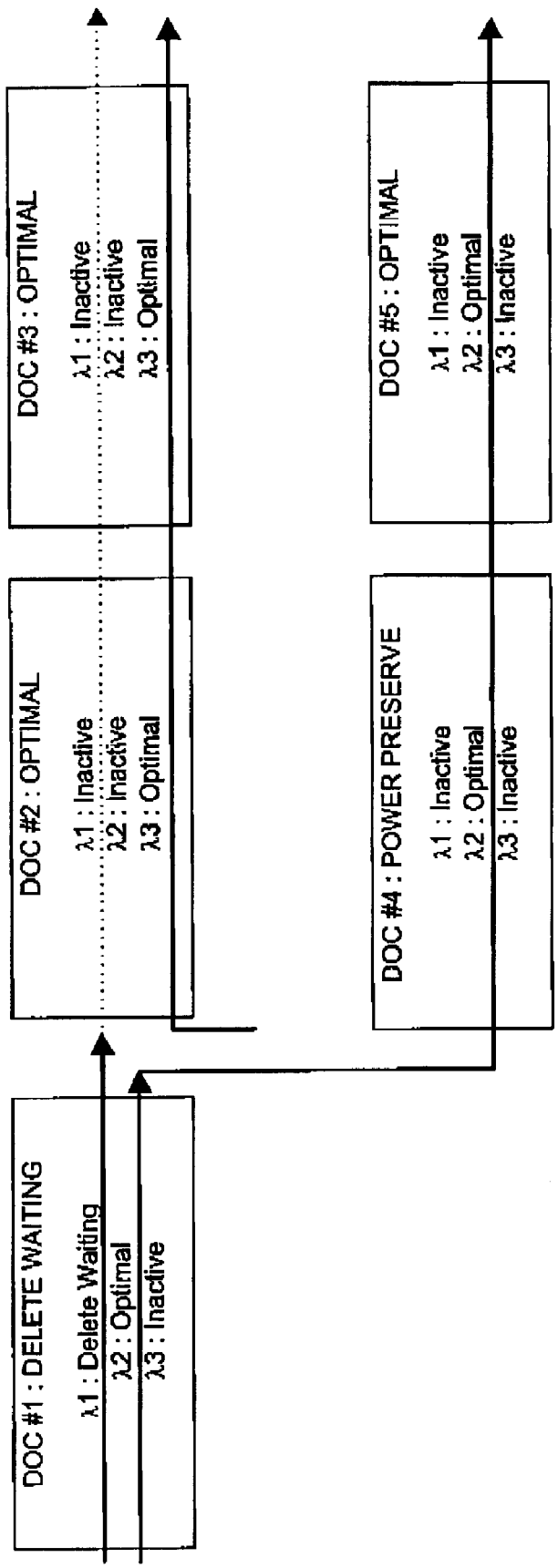
FIG. 7G illustrates DOC4 entering a power preserve mode in order to block cascading effects when DOC1 executes its pending delete request.

After the Domain 2 change has been implemented and Domain 2 has returned to an optimal state with λ1 inactive, DOC2 notifies DOC1. DOC1 then determines that the conditions are still not satisfactory (as domain 4 will be affected) so it again notifies its downstream neighbors of its intended action. Domains 2 and 4 then reevaluate, but as Domain 2 no longer has any pass-through channels from Domain 1 it will not be affected. Domain 4 still has pass-through channels which may be indirectly affected (in this example λ2) so it enters the POWER PRESERVE mode as shown in FIG. 7G. Domain 4 notifies its neighbors that it wants to change into POWER PRESERVE mode and will do so once it gets replies from Domain 1 and 5 that they are in a satisfactory state for this change (which they will be in this example).

Figure 7H:
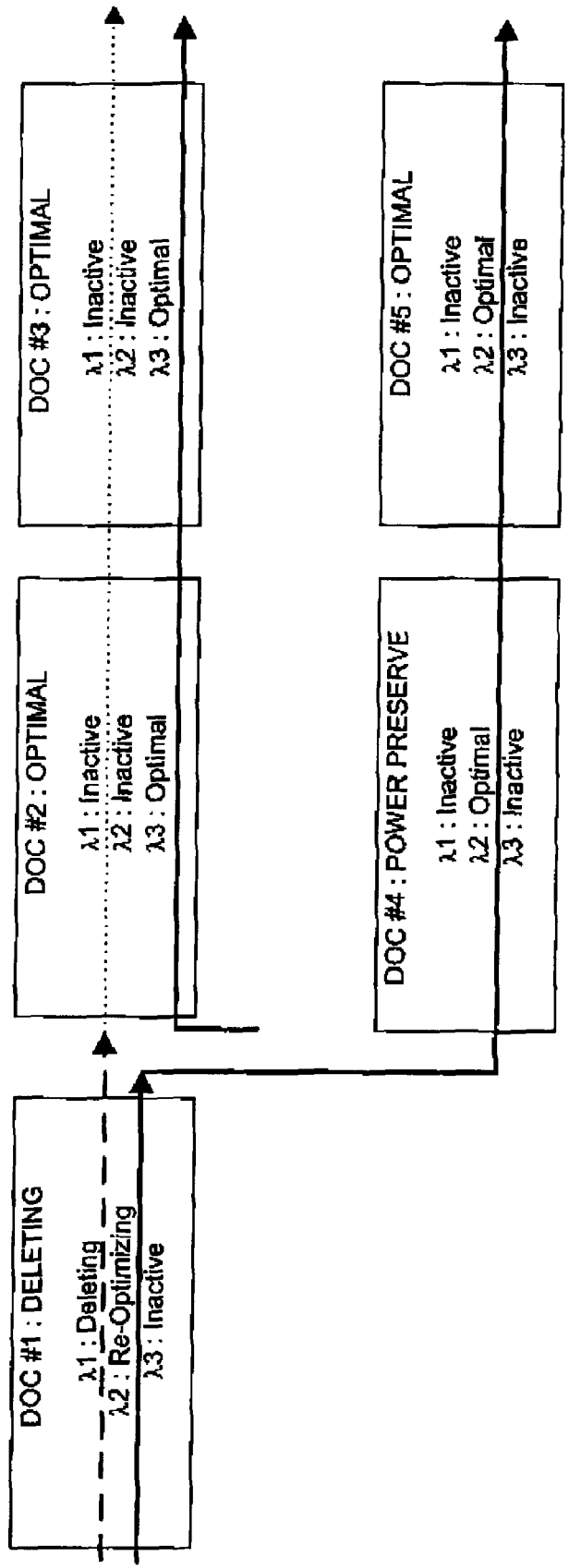
FIG. 7H illustrates DOC1 observing the downstream DOC2 and DOC4 state changes and entering into a deleting state.
Figure 7I:
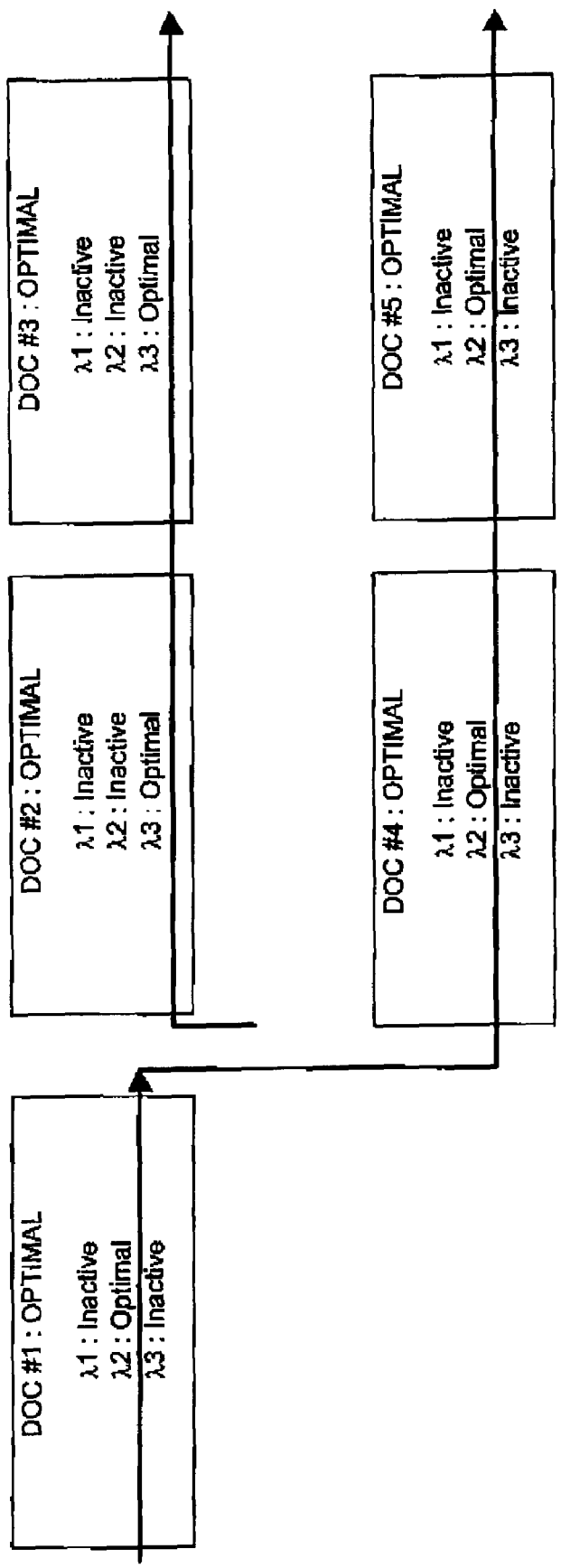
FIG. 7I illustrates DOC4 returning to an optimal state after observing DOC1's return to an optimal state.

Once Domain 4 has entered the POWER PRESERVE mode to protect itself (and downstream domains) from the change which is about to be initiated by Domain 1, Domain 1 enters the deleting state and deletes λ1, and then re-optimizes λ2 to compensate for the change as shown in FIG. 7H. Once Domain 1 has successfully deleted λ1, Domains 2 and 4 are notified of the state change. Domain 4 will then exit POWER PRESERVE mode, and notify its neighbors who in turn respond that they do not need to change their state. Domain 4 then returns to OPTIMAL and now every domain is in optimal state as shown in FIG. 7I.

As stated, FIG. 7 illustrates an example process, according to an embodiment of the invention. As for most of the embodiments described herein alternatives can be made without departing from the spirit of the invention. For example, it is not necessary for the 'delete waiting' state to ripple down from the ingress node. The process can start directly at the egress node. In other words, the domain controllers will send messages through the successive domains for the channel in question, until the egress domain is reached. The egress domain will then delete the channel, at which point the intervening domains will delete the channel in succession, until the ingress domain completes the action. Suitable filtering modes can still be used to prevent cascading affects if desired.

Figure 8:
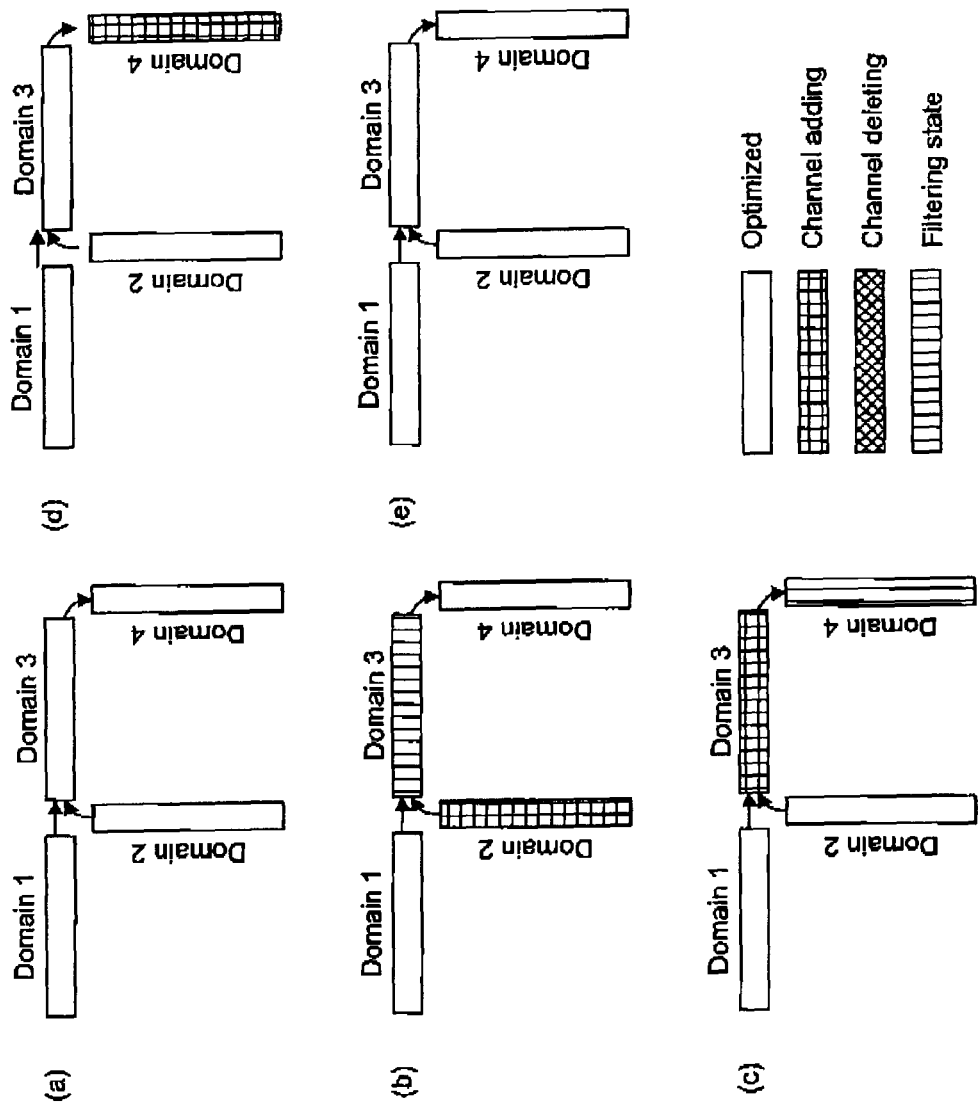
FIG. 8 illustrates the addition of a channel in one of 4 optically coupled domains and the actions taken by the other domains in response thereto.

FIG. 8 illustrates the addition of a channel in one of 4 optically coupled domains and the actions taken by other domains in response thereto. FIG. 8a illustrates how all four domains are initially in an optimized or steady state. In FIG. 8b Domain 2 is shown to be adding a channel. As Domain 3 is downstream from Domain 2 it enters into a filtering state, for example power preserve mode in order to prevent changes from cascading. Domain 4 remains in the optimized state as, it is protected from cascading affects by the filtering stage of Domain 3. FIG. 8c shows the state of the domains after Domain 2 has completed adding the channel. In this figure Domain 2 is now in an optimized state and Domain 3 proceeds to add the channel. Consequently Domain 3 sends a signal to Domain 4 saying I am now adding a channel at which point Domain 4 will enter into a filtering state. In FIG. 8d Domain 3 has completed adding the channel and is once again in an optimized state at which point Domain 4 enters into the channel adding mode. Once completed Domain 4 returns to an optimized state as shown in FIG. 8e. It should be appreciated that this is a simplified scenario as it does not show the Domains entering into a re-optimization stage in order to make adjustments in order to compensate for changes, drift, . . . etc., although not shown, it should be appreciated that a domain in a re-optimization state will also communicate this fact to neighboring domains which will be affected, who will in turn enter into a filtering or locked state to prevent cascading affects.

Figure 9:
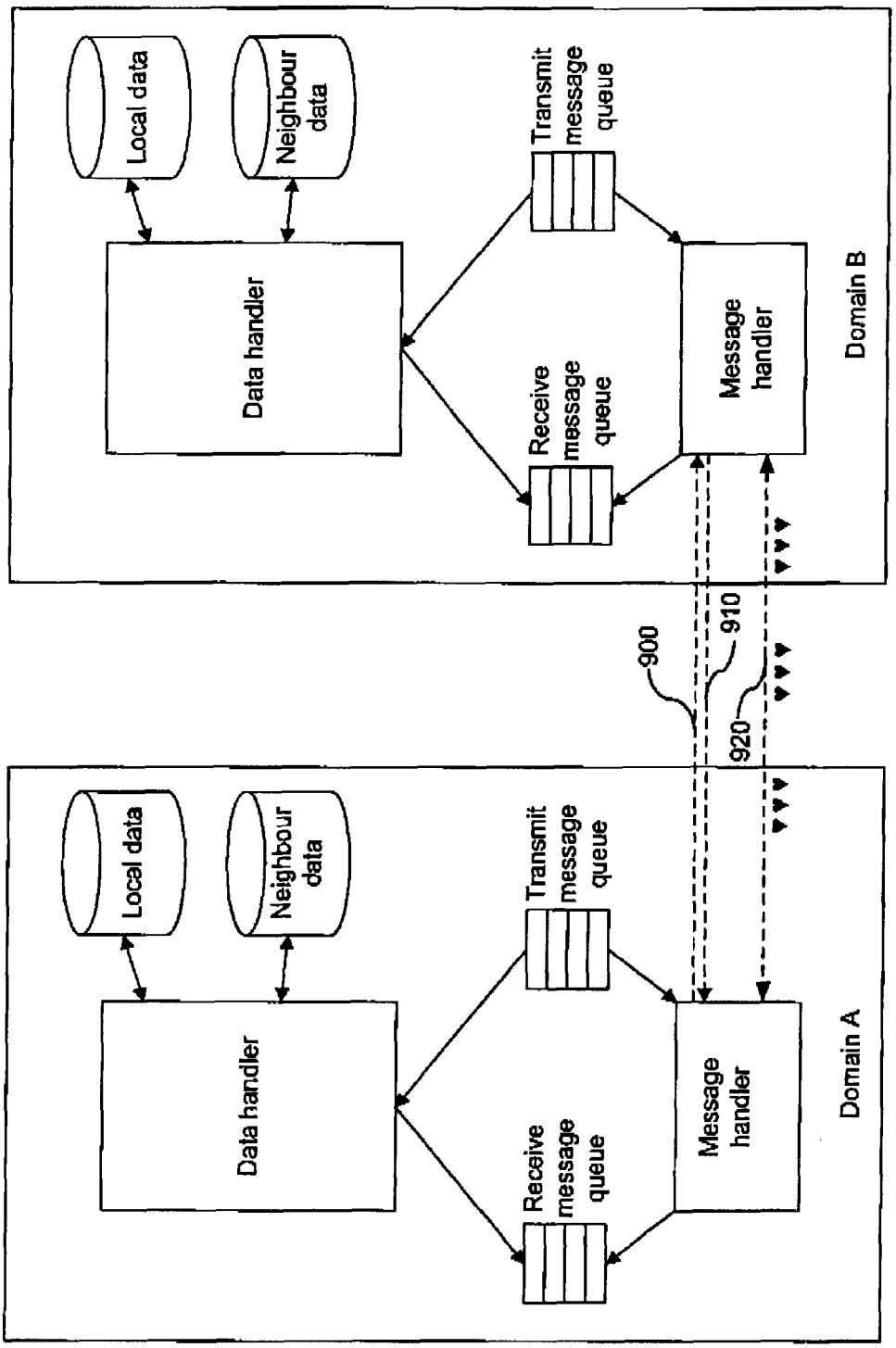
FIG. 9 is an illustration of the inter-domain messaging that occurs in the background of some embodiments of the present invention.

FIG. 9 is an illustration of the inter-domain messaging that occurs in the background of some embodiments of the present invention. Two domains are illustrated, domain A and domain B. They are exchanging a series of handshakes. Domain A is communicating a series of handshakes 900 to domain B, and domain B is communicating a series of handshakes 910 to domain A. These handshakes are the domains' way of informing their neighbors of their local intentions. Such handshakes can trigger the local branching control state machine flowchart described in greater detail below with reference to FIG. 10, instances of which run independently in neighboring domains. All of the handshakes 900 and 910 continue until all domains, in this case domains A and B, have negotiated a stable set of states, at which point a service request (or other state change) can begin. As should be appreciated, various transport mechanisms for performing the communication between the domains can used.

In the figure, each domain is also shown to have several components which are typical to such a messaging interface. This includes a message handler at the lowest level which is responsible for sending and receiving messages. Associated with this component are queues which store messages which are received or transmitted until they can be processed by either the message handler or the data handler components. The data handler is also shown to be connected to storage units which store data of different types. In this example there is storage for data from neighboring domains which is shown to be separate from the local data which is associated with the domain it resides in. In the case that there are more neighboring domains there could be additional storage units created within each domain to store the data from the additional neighbors. It should be noted that this figure illustrates an exemplary implementation.

In the case where there are adjacent domains where the upstream domain A is performing an action, such as a service request, and the downstream domain B is filtering, for example, in power preserve mode, a heartbeat 920 is set up between the two domains. The heartbeat is distinct from the handshakes 900 and 910 in that the handshake is used before any actions take place and is used by the domains to negotiate what happens next, whereas the heartbeat 920 is used once an upstream action is in progress and its purpose is to confirm that the downstream is still in an appropriate mode, such as a filtering mode. The heartbeat 920 lasts for the duration of the upstream action, and if it is broken by any means, the upstream action will abort to protect the downstream domain from any harm.

Figure 10:
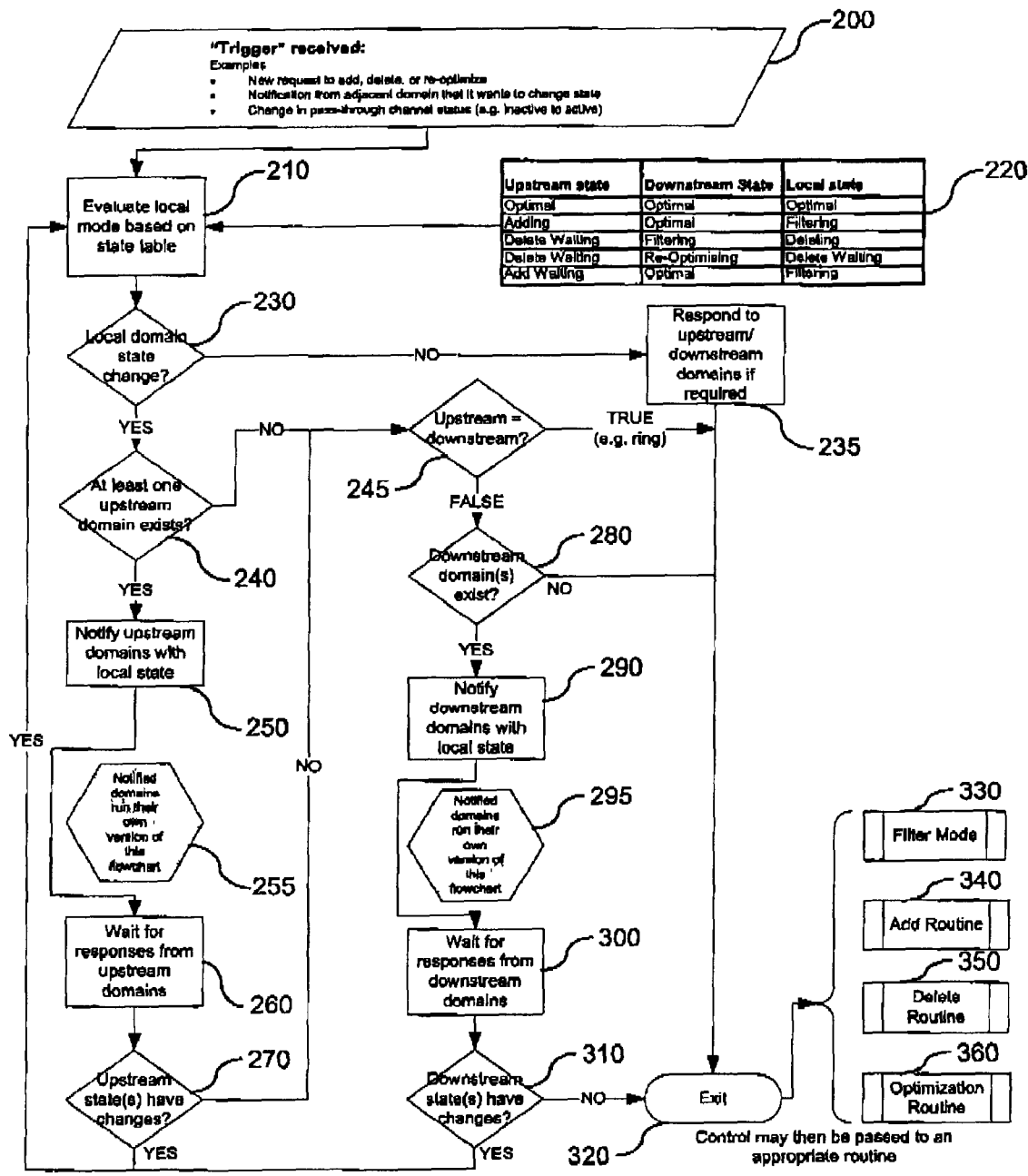
FIG. 10 is a flowchart illustrating a process executed by a processor of a Domain Controller, according to an embodiment of the invention.

FIG. 10 is a flow chart illustrating the method steps carried out by the domain controller according to an embodiment of the invention. It should be noted that the domains cooperate by each following this same (or similar) process and evaluates the steps independently. The method is typically initiated when a domain receives a "trigger" at step 200, which can be a request from within the domain or a message from a neighboring domain. Examples of this include requests to add channels, delete channels or to re-optimize existing channels, state changes in neighboring domains, or a change in the state of an existing channel (e.g. from inactive to active).

The method then evaluates the local mode at step 210 based on a state table 220 which is shown in the diagram. This state table 220 is given as an example only and is truncated for clarity. The complete table preferably contains all possible states and combinations thereof for each of the upstream, downstream and local domains. The data in table 220 would also depend on configuration, implementation and channel network characteristics. The domain controller uses this to determine whether a local state change is required 230. If no local state change is required at step 230, the method moves to step 235, where it responds to any other domains which may have sent notifications to the local domain and then exits.

If the domain controller determines that a change is needed then it determines whether there exists an upstream neighboring DOC 240. If there is no upstream neighboring DOC, and if at step 245 the domain controller determines that this is because the upstream and downstream DOCs are the same, the procedure is exited at step 320. If, on the other hand, there is a determination at step 240 that there is at least one upstream DOC, the domain controller sends a notification message to the upstream DOC(s) and provides its local state information and its intended change 250. The domain controller will then wait for a response(s) from upstream DOC(s) 260 while the upstream DOC(s) run their own instance of this method 255. If at step 270, it is determined that the up upstream states have changed then the domain controller returns to evaluate the local mode 210 to determine what mode to allow based on truth table which depends on the upstream state mode. Once again, if there are no downstream neighboring DOCs then it proceeds to the exit stage 320.

However if at step 240, it was determined that no upstream domains existed, and at step 245 it was determined that the upstream and downstream docs are not identical, then if there are downstream DOC(s), the domain controller then notifies them with its local state information and its intended change 290. Similarly the downstream DOCs run their own instances of this method at 295. As noted in the figure, these domains run an identical method to this one in response to the "trigger" of receiving a notification. Once the local DOC receive responses from the downstream DOCs 300 it determines whether they have changed or not at step 310. If there are no changes detected at step 310, the method proceeds to the exit step 320, otherwise it reverts back to step 210 as the downstream state has changed. If there is no change in the neighboring states, either at step 270 or step 310, then the process continues, either directly from step 270 or via steps 210, 230 and 240 if proceeding from a determination at step 310, to a step 245 which checks whether the upstream domains which were just notified are actually the same domains as are seen downstream. This would be the case in a ring type architecture where each of the two ends of the same neighboring domain are upstream and downstream respectively. If this is true then the notification process is complete and execution terminates at step 320. If at step 245 it is determined that the downstream domains are different than those upstream then the process continues with the check of the downstream domains as already described with respect to step 280. At the exit stage 320 control may be passed to the appropriate routine, namely a sequence or routine for putting the domain name to the power preserve mode 330, or an add routine 340 or delete routine 350 or a re-optimization routine 360 depending on the state change that is determined to be made if any.

It should be noted that a similar cooperative process can be implemented for other actions and states, for example in the event of fault detection (restoration and/or protection switching). It is the combination of this co-operative process, auto discovery and the messaging between the neighboring domains that creates the effect of self organizing, self optimizing, self-monitoring and self-healing collective actions.

As stated, one advantage of some of the embodiments described herein is they can be used to eliminate the need for unnecessary O-E conversions. However, even with the improvements described herein, some degree of optical impairments may occur. Furthermore these can potentially grow and cascade through the system, eventually degrading the signal to the point where the data carried will be corrupted. Accordingly, some embodiments of the invention include appropriately spaced O-E-O nodes which perform an optical to electrical to optical conversion for the purpose of propagation impairment mitigation. This can be used to reconstruct a clean signal in order to prevent this type of cascaded degradation.

An additional embodiment of the invention allows existing equipment to grow by consolidating existing nodes together into one node which can manage channel routing through that node. For example, multiple shelves at a flexibility site can be grouped together. Another embodiment of the present invention allows existing systems to grow by supporting multiple degrees of branching connectivity.

Yet another embodiment of the present invention allows for preferred traffic paths through a node (which will be setup automatically), while maintaining full control over the provisioning of any available channel connection. In a still further embodiment of the present invention, the fiber topology between nodes can be automatically discovered, and communications between the domains can be established automatically as well. In a still further embodiment, the autonomy of the system is enhanced by allowing neighboring optical domains to coordinate and manage their optical resources as peers while providing a management layer which coordinates the global information required to provision and control the channels.

In a still further embodiment of the present invention, inter-node signaling is provided between domains to prevent optical degradations and transients, as well as to furnish the management system with useful information about channels and the domains they pass through. In a yet still further embodiment of the invention, the information provided by inter-node signaling can also include information that enhances the robustness of the system by requiring visibility of a channel's fault information in upstream and downstream photonic domains for control purposes, as well as for network management purposes.

As discussed, domains downstream from an intended change can enter into a filtering mode or Power Preserve mode. For example, optical power target control is used as means to mitigate controller interaction between the multiple systems. Accordingly, analog control parameters communicated between domains are used by each domain for determining control targets. These control targets are determined to limit additional fluctuations caused by cascading control systems. Similarly, each domain preferably includes an ingress node at a domain border which is capable of per-channel power control to filter the interactions with neighboring domains. It should be recognized that this can instead be provided at the egress node. This can be useful in providing a mechanism for interconnecting with systems which have not been designed for optical peering, as it provides a mode in which the filtered operation is maintained at this domain boundary, without requiring changes to the existing system.

The figures and the above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A method of controlling an optical network, said optical network comprising a set of domains, with each domain comprising a set of network elements controlled by a domain controller, said method comprising:
   determining a requirement to adjust physical parameters;
   said domain controller controlling a state within said domain to satisfy said requirements; and
   communicating to one or more neighboring domains information about state changes needed to satisfy said requirement.

2. A method as claimed in claim 1 further comprising:
   wherein said determining step comprises receiving an indication of the parameters affected by a node of a neighboring domain;
   wherein said controlling step comprises adjusting physical parameters to compensate for effects introduced by said node of a neighboring domain.

3. A method as claimed in claim 1 wherein said determining step comprises receiving a service request which requires the domain to adjust parameters in order to satisfy the service request.

4. A method as claimed in claim 1 wherein each domain is defined by a pair of border nodes which are capable of at least one optical add/drop function.

5. A method as claimed in claim 1 wherein each domain is defined by a pair of border nodes which are capable of optical branching.

6. A method as claimed in claim 1 wherein said set of domains are optically coupled.

7. A method as claimed in claim 6 wherein the step of communicating comprises said domain controller first sending a signal to neighboring domain controllers comprising an indication of the parameters or state it intends to change prior to implementing said change.

8. A method as claimed in claim 1, wherein said physical parameters are analog parameters of an optical transmission medium.

9. A method as claimed in claim 8 wherein said analog parameters are analog parameters which can affect signals in neighboring domains, and further comprising establishing a filtering operation at a domain boundary where cascading effects can occur.

10. A method as claimed in claim 8 wherein said analog parameters are analog parameters which can affect downstream signals and wherein the effects can cascade to signals in downstream domains and further comprising establishing a filtering operation at a domain boundary where cascading effects can occur.

11. An optical network comprising:
   a plurality of optically interconnected control domains, each domain comprising a domain controller;
   a plurality of nodes interconnected by transmission media within each domain; and
   at least one transmission path between neighboring domains configured to allow traversal of optical channels between said neighboring domains without electrical conversion; wherein each domain controller includes a processor, and an executable file embodied in machine readable memory, which when executed by said processor, causes said domain controller to:
      i) make determinations of control parameters and state for its domain; and
      ii) interact with domain controllers of at least one optically interconnected neighboring domain such that information regarding changes to said control parameters and state are communicated between said domain controllers.

12. A domain controller for controlling one of a plurality of optically coupled domains of an optical network comprising:
   determining means for determining a requirement to adjust physical parameters;
   means for controlling the state within said domain to satisfy said requirements; and
   means for communicating to one or more neighboring domains information about state changes needed to satisfy said requirement.

13. A domain controller as claimed in claim 12 wherein said determining means comprises receiving a signal indicative of a requirement to adjust physical parameters.

14. A domain controller as claimed in claim 13 wherein said signal includes information about state changes intended by neighboring domains.

15. A domain controller as claimed in claim 12 wherein said state changes are implemented to limit additional fluctuations caused by cascading control systems.

16. A domain controller as claimed in claim 12 wherein said information about state changes comprises information of changes in physical parameters.

17. A domain controller as claimed in claim 16 wherein said parameters include parameters to coordinate the control of an end-to-end control and optimization of the optical channels.

18. A domain controller as claimed in claim 16 wherein said parameters include parameters which describe the performance of the path which is contained within the domain.

19. A domain controller as claimed in claim 16 wherein said parameters include parameters which advertise available links with enough information to calculate the viability of the channel traversing the path.

20. A domain controller as claimed in claim 12 wherein said means for communicating transmits information regarding intended state changes prior to implementation, in order to provide neighboring domains an opportunity to take action to prevent undesirable affects in the neighboring domains.

* * * * *